United States Patent [19]

Danesh

[11] 3,958,022

[45] May 18, 1976

[54] PROCESS FOR TREATING SEAFOOD

[76] Inventor: Andre Danesh, 188 Mason Terrace, Brookline, Mass. 02146

[22] Filed: Feb. 27, 1974

[21] Appl. No.: 446,221

Related U.S. Application Data

[63] Continuation-in-part of Ser. No. 184,283, Sept. 27, 1971, abandoned.

[52] U.S. Cl. ................................ 426/271; 426/643
[51] Int. Cl.² ........................................ A22C 25/00
[58] Field of Search ........... 426/486, 271, 342, 376, 426/212

[56] References Cited
UNITED STATES PATENTS

| | | | |
|---|---|---|---|
| 2,294,428 | 9/1962 | Stockhamer | 426/7 |
| 2,554,625 | 5/1951 | McFee | 426/325 |
| 2,669,520 | 2/1954 | Fellers | 426/271 |
| 2,847,308 | 8/1958 | Bersworth et al. | 426/271 |
| 3,552,978 | 1/1971 | Inklaar | 426/281 |
| 3,736,153 | 5/1973 | Spears | 426/271 |

OTHER PUBLICATIONS

Furia, "Food Technology", Dec., 1964, pp. 50–58.

*Primary Examiner*—Raymond N. Jones
*Attorney, Agent, or Firm*—Robert L. Goldberg

[57] ABSTRACT

Methods are set forth for the treatment of seafood whereby toxic heavy metal ions, especially mercury ions, are removed from the seafood making the same safe for consumption. In a preferred embodiment of the invention, the method comprises washing the seafood with an organic sulphur complexing agent for heavy metal ions and heating the seafood at a temperature and for a time sufficient to volatilize the heavy metal ions therefrom.

8 Claims, No Drawings

PROCESS FOR TREATING SEAFOOD

CROSS-REFERENCE TO RELATED APPLICATIONS

This application is a continuation-in-part of copending U.S. Patent application Ser. No. 184,283 filed Sept. 27, 1971, now abandoned.

BACKGROUND OF THE INVENTION

1. Introduction

This invention relates to the treatment of seafood and more particularly, to a process of treating seafood whereby heavy metal ions are removed from the seafood making the same safe for human consumption.

2. Description of the Prior Art

As is known in the art, seafood such as crabs, lobsters, oysters, shrimp and various fishes such as tuna, swordfish and the like are frequently contaminated with small quantities of heavy metal ions, particularly mercury ions, which, though relatively low in concentration, are sufficiently high in concentration to render the seafood unfit or dangerous for human consumption. This problem is particularly acute with swordfish and is becoming more acute with tunafish. Attempts have been made in the prior art to remove these heavy metal ions from the seafood. However, because the seafood is unsafe for human consumption when it contains only trace quantities of the heavy metal ions, the prior art has been unsuccessful in finding a satisfactory treatment method.

STATEMENT OF THE INVENTION

The subject invention provides methods for removal of the heavy metal ions from seafood whereby the removal is so complete, the seafood is completely safe for human consumption.

One method comprises heating the seafood under conditions whereby the heavy metal ions are volatilized from the seafood. Another method comprises contacting the seafood with a complexing agent for the heavy metal ions, either before or after cooking. Preferably, the seafood is ground and washed with the complexing agent then heated to volatilize the heavy metal ions. The preferred complexing agents are organic sulphur complexing agents though other agents may be used.

DESCRIPTION OF THE PREFERRED EMBODIMENTS

The term "seafood" as used herein is intended to mean any of the consumable fishes noted above and includes within its scope, the crustaceans. The invention, however, is most applicable to swordfish and tunafish.

The term "heavy metal ions" as used herein is intended to mean ions of mercury, lead and cadmium though the more serious problem solved by the invention is the removal of mercury ions.

In the broadest embodiment of the invention, the seafood is heated to an elevated temperature and maintained at said temperature for a time sufficient to volatilize all of the heavy meta ions from the seafood. The temperature used is preferably no less than the boiling point of water and generally varies between about 212° and 300°F and more preferably varies between 220° and 270°F. It has been found that a substantial increase in volatility occurs above 220°F.

The seafood is desirably maintained under pressure during the heating and typically, the pressure varies between about 1 and 250 atmospheres and more preferably between about 1.5 and 50 atmospheres.

It should be noted that in the canning of seafood, the seafood is partially cooked, canned and sealed and then heated again. Though heavy metal ions may be volatilized during this process they eventually condense on the walls of the can and then migrate back into the seafood thereby again contaminating the seafood. The invention herein differs in that the seafood is heat treated completely and under more rigorous conditions before canning.

The time of heat treatment is that time necessary to volatilize the heavy metal ions from the seafood. It should be noted that the parameters of temperature, pressure and time are more rigorous than would be encountered in the normal cooking of the seafood and consequently, the seafood will be somewhat "overcooked" from this operation.

A preferred heat treatment method comprises steaming the seafood in a closed container.

Though not wishing to be bound by theory, it is believed that the mercury contained in the seafood is covalently bonded to the protein of the seafood. The relatively rigorous heat treatment conditions is believed to cleave a covalent bond between the mercury and the protein of the seafood resulting in volatilization of organic-mercury compounds-probably methyl mercury compounds.

In a preferred embodiment of the invention, the seafood is ground into small pieces before heat treatment to provide a substantially greater surface area so as to thereby facilitate volatilization of the heavy metal ions. Consequently, the heat treatment need not be rigorous and the lower portions of the above ranges of temperatures and pressure may be used.

When the seafood is ground prior to heat treatment, the finished product may be used for fishcaskes, fish sausage, fish fillets and the like. If desired, an edible binder, such as gelatin, can be used to form the final product.

In another embodiment of the invention, the seafood is ground and washed in a solution of a complexing agent for the heavy metal ions to complex said ions and remove the same from the seafood. A wash of from 1 to 30 minutes, preferably 10 minutes is satisfactory.

The complexing agent used for the seafood is selected on the basis of non-toxicity-e.g., it must be suitable for human consumption and an ability to tightly bond with heavy metal ions.

A preferred class of complexing agents are organic sulphur compounds including the sulfides and disulfides are represented by the formulas: R-S-R and R-S-S-R wherein R can be hydrogen (provided that no more than one R is hydrogen), alkyl, cycloalkyl, aryl, alkylthioalkyl and combinations thereof wherein compounds contain from 2 to 24 carbon atoms. Suitable cyclic sulfides and disulfides may be represented by the formula:

wherein x is an integer having a value of 1 or 2, R' is hydrogen or alkyl having 1 to 4 carbon atoms, and n is an integer of from 3 to 5.

Representative organic sulphur compounds suitable for use in the invention include dimethyl sulfide, di-n-propyl sulfide, di-n-butyl sulfide, methyl-n-butyl sulfide, diethyl disulfide, di-tert-dodecyl sulfide, n-butyl tert-dodecyl sulfide, di-tert-dodecyl disulfide, di-n-butyl tert-dodecyl sulfide, di-tert-dodecyl disulfide, di-n-butyl disulfide, n-butyl cyclo-hexyl sulfide, dicyl-clohexyl sulfide, dicyclohexyl sulfide, n-butyl phenyl sulfide, di(phenylethyl) sulfide, di-tert-n-butyl phenyl sulfide, diphenyl sulfide, 3,6-dithiaoctane, phenyl co-clohexyl sulfide, 6,9-dithiatetradecane, benzyl cyclo-hexyl disulfide, ditert-octyl disulfide, diisobutyl sulfide, n-octadecyl ethyl sulfide, 2,2,7,7-tetramethyl-3,6-dithiaoctane, 12,15-diathiahexacosane, thiacyclobutane, thiacyclopentane, thiacyclohexane, 2methyl-thiacyclopentane, 2,2-diethylthiacyclohexane, 2-n-butylthiacyclopentane, 2-n-propylthiacyclobutane, thioacetamide, thioacetic acid, cysteine, thiobenzoic acid, thiodiethylene glycol, thiodiglycol, thiodiglycolic acid, thiodipropionic acid, thioglycolic acid, thiomalic acid, salts of any of the foregoing where applicable and mixtures thereof.

Complexing agents other than the organic sulphur complexing agents may be used provided they conform to the general criteria set forth above. Examples of such complexing agents include organic nitrogen acids such as ethylenediaminetetraacetic acid, nirilotriacetic acid, ethylenediaminebis (O-hydroxyphenylacetic acid), aminodiacetic acid, glycinediethylene-triaminopentacetic acid, N,N-ethylebis(2-O-hydroxy-phenyl)-2-hydroxyethylglycine, hydroxyethylene-thylenediaminetriacetic acid, glutamic acid, polyaminopolycarboxylic acid, and the like; various polyamines such as D-penicillinamine, ethylenediamine, diethylenetriamine, triethylenetetraamine, thiamine, and the like; carboxylic acids, such as ascorbic, diglycolic acid and citric acid and the like. Moreover, mixtures of complexing agents may be used and it is preferred that the organic sulphur complexing agents be used in combination with one or more of the foregoing complexing agents.

In treating the seafood with the complexing agent, the seafood is washed in a relatively dilute solution of the complexing agent, preferably an aqueous solution. The concentration of the complexing agent in the solution may vary between about 0.1 and 10% by weight of the solution and preferably varies between about 1 and 2.5%. It should be noted that the heavy metal ions are present in the seafood in only trace quantities and therefore, the concentration of the complexing agent may be low, all that is necessary is that in contact with the seafood, it be in molar excess of the concentration of the heavy metal ions.

In an alternative embodiment of the above, the complexing agent may be sprinkled onto the seafood, either in solid or liquid form, before or after cooking the seafood, provided that if used after cooking, it is applied to the seafood while hot. In this way, though the heavy metal ions will not volatilize from the seafood, the heavy metal ions will complex with the complexing agent and will be passed from the body after digestion.

In the most preferred embodiment of the invention, ground seafood is first washed with the solution of the complexing agent and then heat treated, both methods in accordance with the description set forth above.

EXAMPLE 1

A piece of swordfish contaminated with mercury was ground until a homogeneous mixture was obtained. Mercury content of the swordfish was approximately 1.10 ppm.

A 10 gram sample of the swordfish was mixed with 100 cc. of a 1% solution of cysteine hydrochloride for 10 minutes. Thereafter, the swordfish was filtered and heat treated with steam at a temperature of 240°F under about 2½ atmospheres for about 15 minutes.

Following heat treatment, it was found that the mercury content had been reduced below detectable limit.

EXAMPLE 2

The procedure of example 1 was repeated though the mercury content was determined prior to heat treatment. It was found that the mercury content after washing with the solution of cysteine hydrochloride was about 0.2 ppm.

EXAMPLES 3 THROUGH 8

The procedure of example 1 was repeated substituting different solutions of complexing agents for that of example 1. In each case, the solutions used were 1% solutions. The complexing agents employed and the mercury content following treatment is set forth in the following table:

| Example | Complexing Agent | Mercury Content |
| --- | --- | --- |
| 3 | disodium salt of EDTA | 0.80 |
| 4 | mixed calcium-sodium salt of EDTA | 0.80 |
| 5 | trisodium salt of diethylene-triaminopentaacetic acid | 0.70 |
| 6 | mixed calcium sodium salt of diethylenetriamino-pentaacetic acid | 0.75 |
| 7 | 2,3-dimercaptopropanol | n.d. [1] |
| 8 | citric acid | 0.90 |

[1] not detectable

EXAMPLE 9

The swordfish in example 1 was used for this example though it was not ground. The swordfish was cooked in a broiler and after cooking, cysteine hydrochloride sprinkled on the fish. The mercury contained in the fish will not be volatilized but will be passed after eating the fish.

EXAMPLE 10

The swordfish used in example 1 was used for this example though it was not ground. The swordfish was steamed for thirty minutes at a pressure of about 10 atmospheres. After cooking, the mercury level was reduced to about 0.50 ppm. At higher temperatures and/or pressure, mercury concentration would have been reduced further.

It should be understood that various materials can be added to the seafood along with the complexing agent, especially where the complexing agent is to be added to the seafood prior to cooking by a consumer. For example, there may be oxidants, preservatives, acidulants, flavorings, anti-caking agents, emulsifying agents, non-nutritive sweeteners, dietary supplements, stabilizers, minerals, vitamins, fillers, and the like. Such additives are known in the art.

I claim:

1. A process for treating seafood to remove heavy metal ions therefrom, said process comprising washing said seafood with a complexing agent for heavy metal ions and heat treating said seafood at a temperature of at least 212°F and a pressure of at least 1.5 atmospheres for a time sufficient to volatilize and remove said heavy metal ions from said seafood.

2. The process of claim 1 where the seafood is canned subsequent to removal of the heavy metal ions.

3. The process of claim 1 where the temperature varies between 212° and 300°F.

4. The process of claim 3 where the temperature varies between 220° and 270°F.

5. The process of claim 3 where the pressure varies between 1.5 and 250 atmospheres.

6. The process of claim 5 where the pressure varies between 1.5 and 50 atmospheres.

7. The process of claim 1 where the complexing agent is an organic sulphur compound.

8. The process of claim 7 where the complexing agent is cysteine hydrochloride.

* * * * *